United States Patent
Elreich

(10) Patent No.: US 11,434,611 B2
(45) Date of Patent: Sep. 6, 2022

(54) TRANSPORTATION SYSTEMS FOR HYBRID VEHICLES

(71) Applicant: Ahmad Abu Elreich, Fresno, CA (US)

(72) Inventor: Ahmad Abu Elreich, Fresno, CA (US)

(*) Notice: Subject to any disclaimer, the term of this patent is extended or adjusted under 35 U.S.C. 154(b) by 0 days.

(21) Appl. No.: 17/534,581

(22) Filed: Nov. 24, 2021

(65) Prior Publication Data

US 2022/0081851 A1 Mar. 17, 2022

Related U.S. Application Data

(63) Continuation of application No. PCT/US2020/034581, filed on May 26, 2020.

(60) Provisional application No. 62/852,836, filed on May 24, 2019.

(51) Int. Cl.

| | |
|---|---|
| *E01C 1/00* | (2006.01) |
| *B60K 6/44* | (2007.10) |
| *E01C 1/04* | (2006.01) |
| *G08G 7/00* | (2006.01) |
| *B60F 5/02* | (2006.01) |
| *B60K 6/442* | (2007.10) |

(52) U.S. Cl.
CPC .............. *E01C 1/002* (2013.01); *B60K 6/442* (2013.01); *E01C 1/04* (2013.01); *G08G 7/00* (2013.01); *B60F 5/02* (2013.01)

(58) Field of Classification Search
CPC ... E01C 1/002; E01C 1/04; E01C 1/00; B60K 6/442; B60F 5/02; G08G 7/00
See application file for complete search history.

(56) References Cited

U.S. PATENT DOCUMENTS

| | | | |
|---|---|---|---|
| 2,538,517 A | 1/1951 | Hayden | |
| 3,637,099 A * | 1/1972 | Perrier | E04H 6/282 414/629 |
| 6,332,743 B1 | 12/2001 | Park et al. | |

(Continued)

FOREIGN PATENT DOCUMENTS

| | | |
|---|---|---|
| CN | 106652052 A | 5/2017 |
| CN | 107023191 A | 8/2017 |

(Continued)

OTHER PUBLICATIONS

International Search Report of PCT/US2020/034581, dated Aug. 7, 2020.

*Primary Examiner* — Abigail A Risic
(74) *Attorney, Agent, or Firm* — Mark M. Friedman

(57) ABSTRACT

A transportation system for hybrid vehicles. The transportation system may include pillars and a raised pathway. Further, the pillars configured to be vertically mounted on the ground. Further, a first pillar of the pillars may include a first lower portion and a first upper portion. Further, a second pillar of the pillars may include a second lower portion and a second upper portion. Further, the raised pathway supported by the pillars. Further, a raised pathway of the raised pathway may include a first end and a second end. Further, the first end may be supported by the first upper portion of the first pillar. Further, the second end may be supported by the second upper portion of the second pillar. Further, the raised pathway may include a raised transportation surface configured to facilitate transportation of a hybrid vehicle.

18 Claims, 17 Drawing Sheets

(56) References Cited

U.S. PATENT DOCUMENTS

| | | | |
|---|---|---|---|
| 7,143,869 B1* | 12/2006 | Chance | B66F 17/00 |
| | | | 187/253 |
| 9,080,341 B2* | 7/2015 | Meiners | E04H 6/12 |
| 9,894,327 B1* | 2/2018 | Jacob | B60F 5/02 |
| 2009/0053024 A1* | 2/2009 | Myers | E04H 6/06 |
| | | | 414/229 |
| 2009/0214291 A1* | 8/2009 | Farr | E01D 1/00 |
| | | | 404/1 |
| 2009/0303079 A1 | 12/2009 | Khim | |
| 2010/0119338 A1 | 5/2010 | Webster et al. | |
| 2012/0315084 A1* | 12/2012 | Makarov | E01C 1/04 |
| | | | 404/1 |
| 2017/0211287 A1 | 7/2017 | Schmitt et al. | |
| 2020/0224370 A1* | 7/2020 | Zhang | E01C 1/02 |
| 2021/0017719 A1* | 1/2021 | Jamtgaard | E01D 19/02 |

FOREIGN PATENT DOCUMENTS

| | | |
|---|---|---|
| EP | 0603884 A2 | 6/1994 |
| WO | 2018226600 A1 | 12/2018 |

\* cited by examiner

TRANSPORTATION SYSTEMS FOR HYBRID VEHICLES

FIELD OF THE INVENTION

Generally, the present disclosure relates to transportation systems for hybrid vehicles. More specifically, the present invention relates to a multilevel transportation system.

BACKGROUND OF THE INVENTION

Freeways and highways are creating higher car traffic and slower traffic. Also, car accidents increase traffic congestion and slow down the moving cars and freeways. Freeways have a higher risk of higher injuries in car accidents. On the other hand, cities find it hard to make horizontal freeways because they are costly for buying equipped lands by residents and commercial. Also the infrastructure cost of Establishing new Horizontal freeways is high. Further, the urge for safer streets and zero car accidents by self-driving cars needs its own environment for only self-driving at their early stages of technology before the self-driving cars run on normal streets with regular cars. Further, self-driving cars and flying cars are safer for smarter cities and investors.

Existing techniques for transportation systems are deficient with regard to several aspects. For instance, current transportation systems do not provide vertical levels of freeways and roads. Furthermore, current transportation systems do not provide access points to for entering and exiting the vertical levels of the freeways and the roads.

Therefore, there is a need for improved transportation systems for hybrid vehicles that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a schematic of a transportation system for hybrid vehicles, in accordance with some embodiments. Accordingly, the transportation system may include a plurality of pillars and at least one raised pathway. Further, the plurality of pillars configured to be vertically mounted on the ground. Further, a first pillar of the plurality of pillars may include, a first lower portion and a first upper portion. Further, a second pillar of the plurality of pillars may include a second lower portion and a second upper portion. Further, the at least one raised pathway supported by the plurality of pillars. Further, a raised pathway of the at least one raised pathway may include a first end and a second end. Further, the first end may be supported by the first upper portion of the first pillar. Further, the second end may be supported by the second upper portion of the second pillar. Further, the at least one raised pathway may include at least one raised transportation surface configured to facilitate transportation of at least one hybrid vehicle. Further, the at least one hybrid vehicle may be configured for flying and moving over the at least one raised transportation surface. Further, the first pillar may be configured to guide an ascent of the at least one hybrid vehicle from the ground to the first end of the raised pathway. Further, the second pillar may be configured to guide a descent of the at least one hybrid vehicle from the second end of the raised pathway to the ground.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
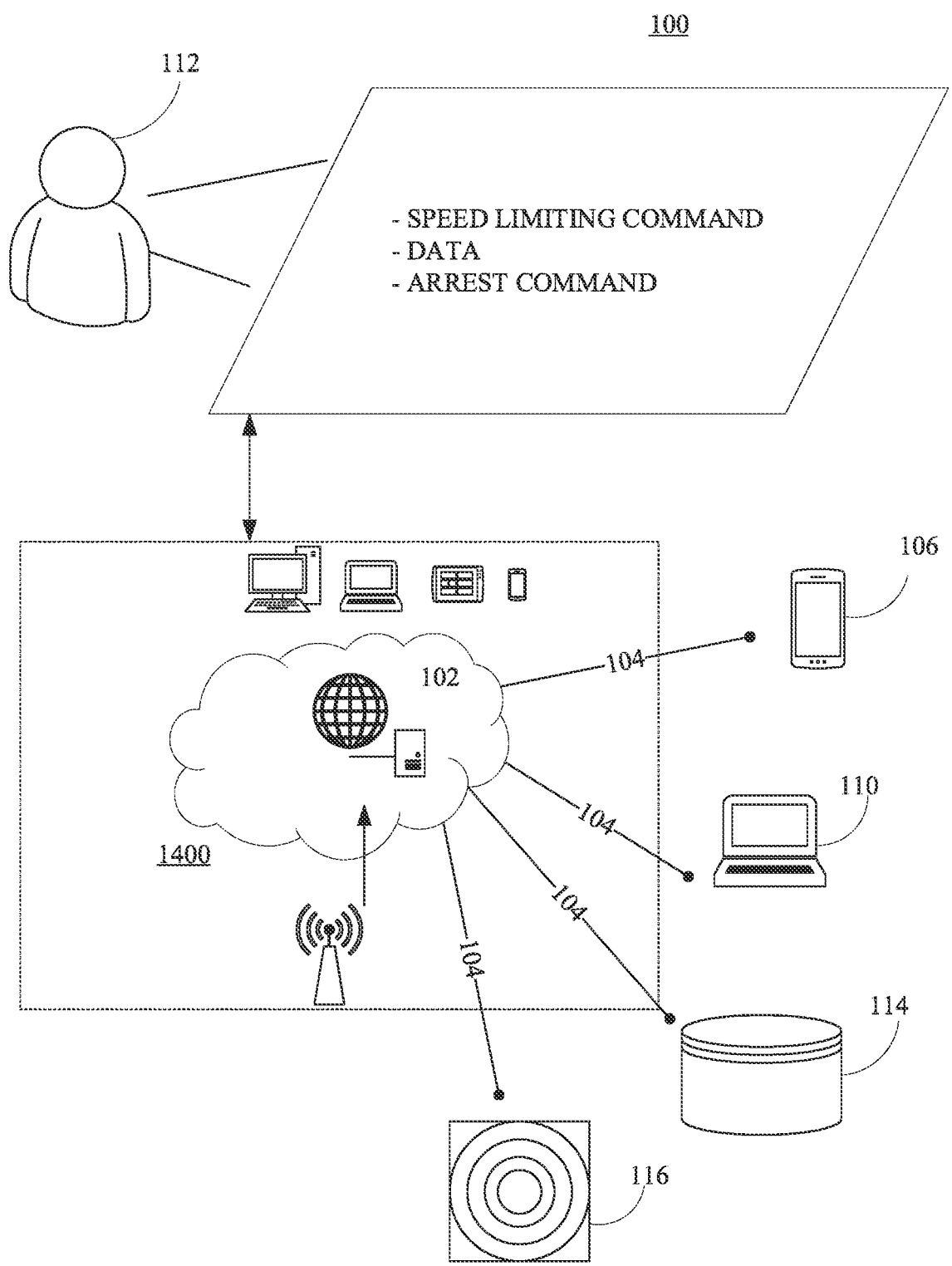
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of transportation systems for hybrid vehicles, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes transportation systems for hybrid vehicles. Further, the transportation systems may include vertical levels of freeways and roads, also stand-alone off the ground freeways, like second level and third levels of the same existing freeway. Further, flying cars may enter the freeway. So, cars fly to enter the freeways. Also, the flying road may be made for self-driving cars for having zero accident environments. Further, self-driving cars and flying cars are safer for smarter cities and investors. The safety of self-driving cars or flying cars is a major issue. Flying cars are a smart solution for fast trips but it is risky to have thousands of flying cars over a city. Also, self-driving cars need time and development to interact with human drivers on the streets and needs time to have 100% safe self-driving car that can deal with traffic and humans. Also with the introduction of self-drive taxi streets, traffic will get worse as traffic is bad with all ride share cars causing bad traffic. Accordingly, the disclosed transportation systems may solve traffic problems and provide safer and faster rides.

Further, the transportation systems may help cities to reduce traffic on busy freeway. Further, the transportation system may be configured for expanding the freeways and roads vertically. Unlike bridges, the only entrance to the higher level of these roads is flying cars and self-driving cars will be the only permitted driving method on these roads to have zero accidents. Further, the vertical roads will have less infrastructure accidents and to be safer and faster than the ground level of roads. Further, the flying roads will allow self-driving cars to build an environment desired by software and technology companies to produce self-driving cars to be 100% safe and provide a zero car accidents environment. Flying cars technology is valuable and it is smart however hundreds or thousands of flying car above cities are high risk. Accordingly, the flying roads means roads may be entered through flying car vertically with permits and monitoring. Further, the cars do not fly over cities but enter and exit in the second level of freeway. Also, an option of building can have automated ceiling and the side fenced are made of different materials or solar panels to provide power for freeway and sell power.

Further, the transportation systems may allow building of smart cities and safer faster rides opportunities. Further, the transportation systems may solve the problems that cities that suffer from traffic congestion while they want to introduce self-driving cars and self-driving taxis. Further, transportation systems may build smart cities and safer and faster rides opportunities. Further, the building of flying roads may provide zero car accidents and also provide safer solution for self-driving cars and flying cars and also provide increased safety. Further, the cars may fly with access points in the entrance or exit of freeways. So no drivers have control over flying manually. Also there will access points to turn the cars on self-driving mode only. All these access points can be made when cars are manufactured. Further, the monitoring system of the transportation system monitors flying cars entrance or exit. Further, the transportation system may include second or higher vertical level of roads that may be reached by flying cars. Further, the cars may have mixed of self-driving technology and flying technology. Further, the transportation system may be used to build higher levels of freeways. Also, the idea and creating roads for flying cars and self-driving cars and humans to drive too if needed. Further, the transportation system may make city smarter. Further, the transportation system may be built inside the cities or used to connect with bridges. Further, the present disclosure describes the second level of freeways and roads for all cities, self-driving cars, flying cars, riders, and drivers. For structure it can be made of steel or key stone blocks wall depends on location and place. Also these roads are used on freeways can be expandable vertically for second level and third level in freeways. Also, these roads can be made inside the city, and the height depends on city designs and locations too. Accordingly, one of the ideas is that entrance and exits through flying cars to enter the roads and exit. Besides the idea of having 100% free car accidents so all cars can use today self-driving cars technology because all problems in self-driving technology are eliminated by making covered roads, so no storms, rain, etc. We also do not allow human drivers unless emergency cars and human or cycling on the roads so it is easy and environment for self-driving technology and connect cars technology to works and we will make our ride share and smart transportation for future cities and 100 percent free of car accidents on freeways lead faster ride since no car accidents block the freeways. Our roads can be good help for emergency cars to reach a car accident on blocked freeways and save people's lives in car accidents. This is the safest smartest technology against flying cars taxis like Uber and others who want to fly over the cities and also it is safer than riding in busy freeways. Further, the present disclosure may make smarter use of existing roads and flying cars technology.

Referring now to figures, FIG. 1 is an illustration of an online platform 100 consistent with various embodiments of the present disclosure. By way of non-limiting example, the online platform 100 to facilitate transportation systems of hybrid vehicles may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 1400.

Figure 2:
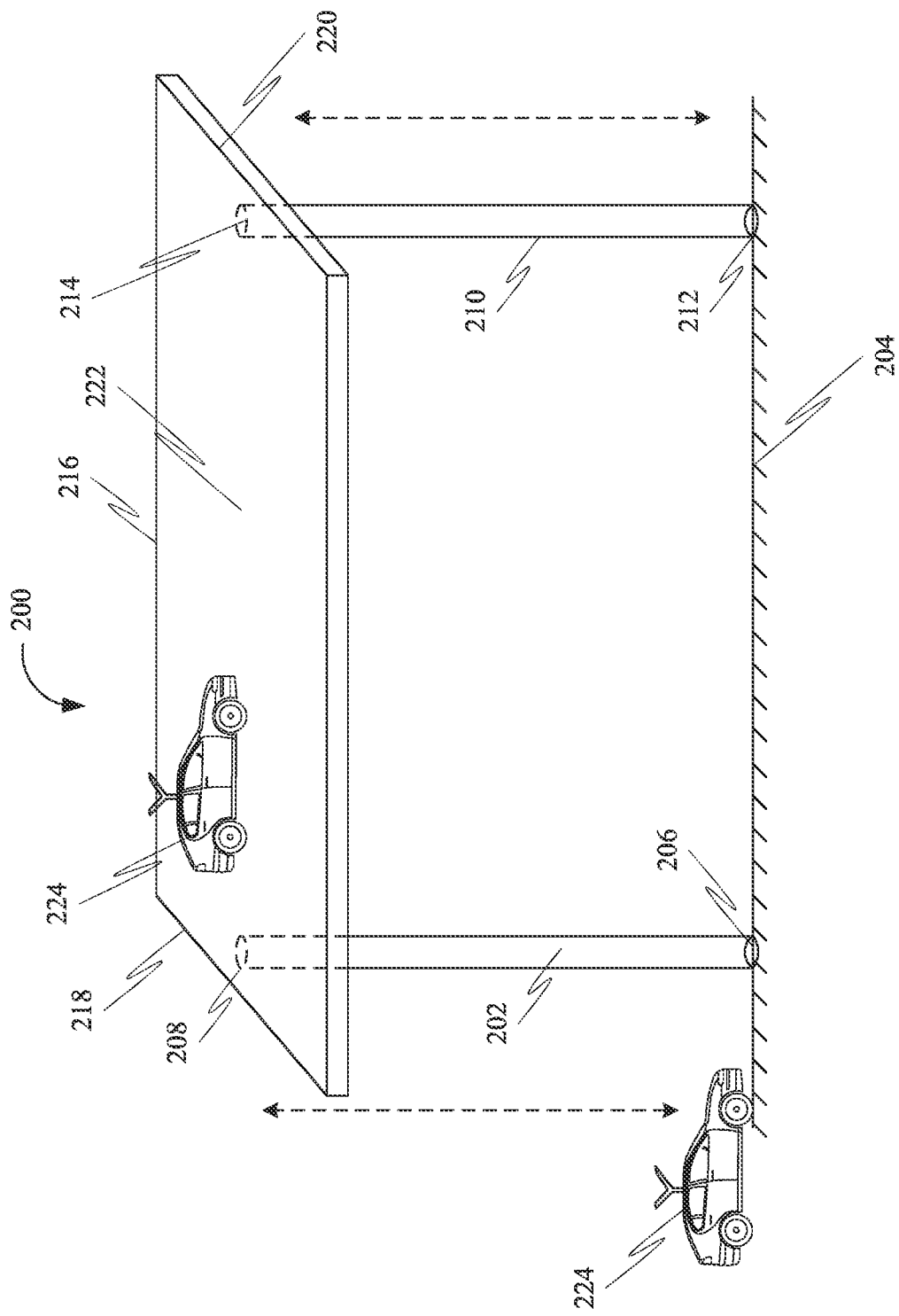
FIG. 2 is a schematic view of a transportation system for hybrid vehicles, in accordance with some embodiments.

FIG. 2 is a schematic view of a transportation system 200 for hybrid vehicles, in accordance with some embodiments. Accordingly, the transportation system 200 may include a plurality of pillars and at least one raised pathway.

Further, the plurality of pillars configured to be vertically mounted on the ground 204. Further, a first pillar 202 of the plurality of pillars may include a first lower portion 206 and a first upper portion 208. Further, a second pillar 210 of the plurality of pillars may include a second lower portion 212 and a second upper portion 214.

Further, the at least one raised pathway may be supported by the plurality of pillars. Further, a raised pathway 216 of the at least one raised pathway may include a first end 218 and a second end 220. Further, the first end 218 may be supported by the first upper portion 208 of the first pillar 202. Further, the second end 220 may be supported by the second upper portion 214 of the second pillar 210. Further, the at least one raised pathway may include at least one raised transportation surface 222 configured to facilitate transportation of at least one hybrid vehicle 224. Further, the at least one hybrid vehicle 224 may be configured for flying and moving over the at least one raised transportation surface 222. Further, the first pillar 202 may be configured to guide an ascent of the at least one hybrid vehicle 224 from the ground 204 to the first end 218 of the raised pathway 216. Further, the second pillar 210 may be configured to guide a descent of the at least one hybrid vehicle 224 from the second end 220 of the raised pathway 216 to the ground 204.

Figure 3:
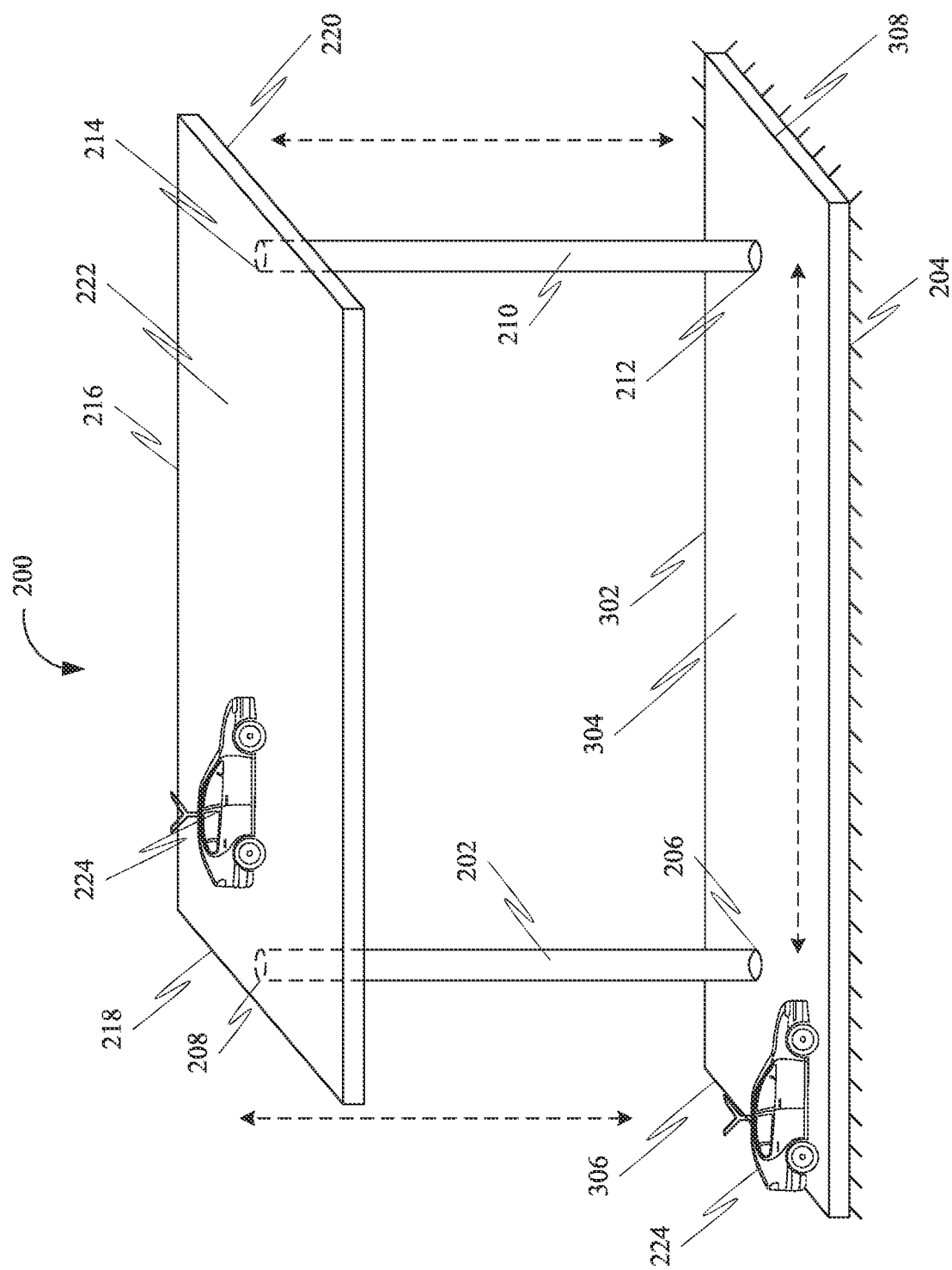
FIG. 3 is a schematic view of the transportation system with ground pathways, in accordance with some embodiments.

Further, in some embodiments, the transportation system 200 may include a plurality of ground pathways. Further, each ground pathway 302 (as shown in FIG. 3) of the plurality of ground pathways may include a ground transportation surface 304 (as shown in FIG. 3) configured to facilitate transportation of the at least one hybrid vehicle 224. Further, each ground pathway 302 may include an exit portion 306 (as shown in FIG. 3) and an entry portion 308 (as shown in FIG. 3). Further, a first exit portion of a first ground pathway may be proximal to the first lower portion 206 of the first pillar 202. Further, a second entry portion of the second ground pathway may be proximal to the second lower portion 212 of the second pillar 210.

Figure 4:
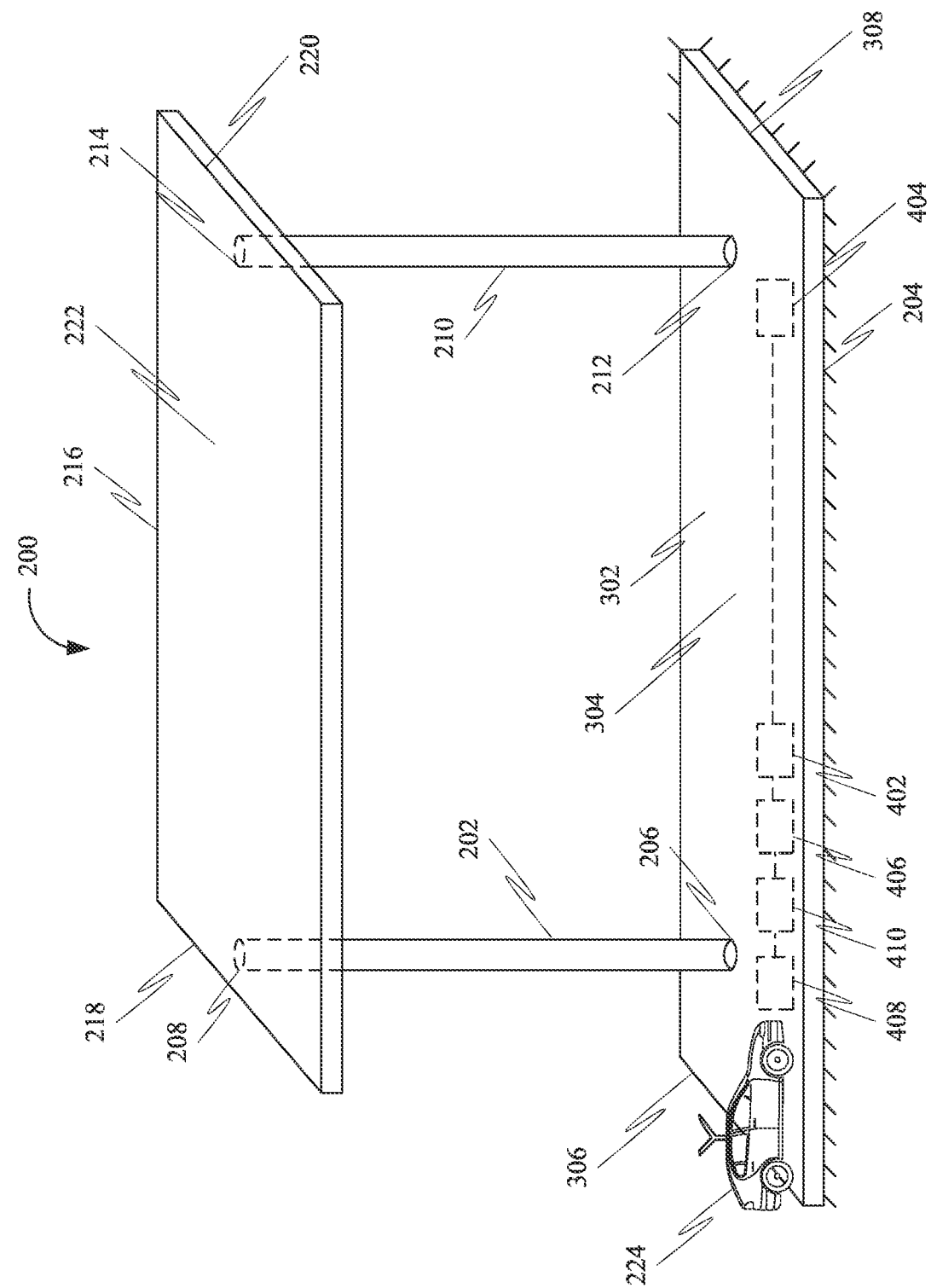
FIG. 4 is a schematic view of the transportation system with the ground pathways, in accordance with some embodiments.

Further, in an embodiment, the transportation system 200 may include a plurality of sensors 402-404 (such as the sensors 116), a storage device 406, a communication device 408 and a processing device 410, as shown in FIG. 4. Further, the plurality of sensors 402-404 may be installed proximal to each of the exit portion 306 and the entry portion 308. Further, the plurality of sensors 402-404 may be configured to capture at least one characteristic of the at least one hybrid vehicle 224. Further, the storage device 406 may be communicatively coupled to the plurality of sensors 402-404. Further, the storage device 406 may be configured for storing data corresponding to the at least one characteristic along with a time-stamp. Further, the communication device 408 may be communicatively coupled to the storage device 406. Further, the communication device 408 may be configured for transmitting the data corresponding to the at least one characteristic to a transportation management device (such as the electronic devices 110, the mobile device 106, etc.) associated with the transportation system 200. Further, the transportation management device may be associated with at least one user (such as the user 112). Further, the transportation management device may include a computing device such as, but not limited to, a smartphone, a smartwatch, a tablet, a desktop, a laptop, and so on. Further, in an embodiment, the processing device 410 may be communicatively coupled with the storage device 406 and the communication device 408. Further, the processing device 410 may be configured for analyzing the data. Further, the processing device 410 may be configured for generating a notification based on the analyzing. Further, the communication device 408 may be configured for transmitting the notification to the transportation management device.

Figure 5:
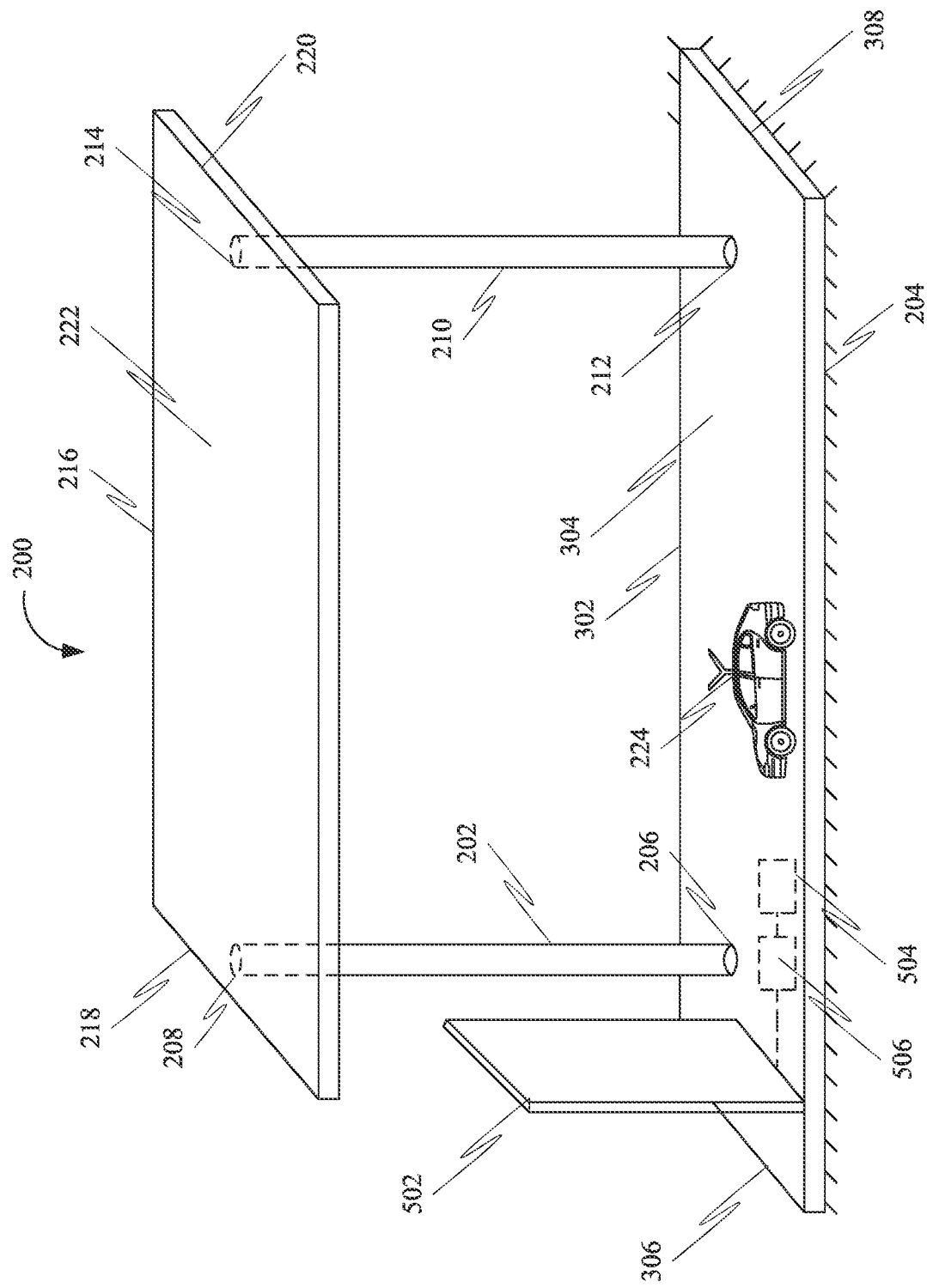
FIG. 5 is a schematic view of the transportation system with control gates, in accordance with some embodiments.

Further, in an embodiment, the transportation system 200 may include a plurality of control gates, a sensor 504 (such as the sensors 116), and a controller 506, as shown in FIG. 5. Further, the plurality of control gates may be installed on the plurality of ground pathways. Further, a control gate 502 may be configured to prevent movement of the at least one hybrid vehicle 224 from a ground pathway 302 to the exit portion 306 of the ground pathway 302. Further, the control gate 502 may be configured to remain in one of a plurality of operational states may include an open state and a closed state. Further, the control gate 502 in the open state may be configured to allow movement of the at least one hybrid vehicle 224 from the ground pathway 302 to the exit portion 306 of the ground pathway 302. Further, the control gate 502 in the closed state may be configured to block movement of the at least one hybrid vehicle 224 from the ground pathway 302 to the exit portion 306 of the ground pathway 302. Further, the sensor 504 may be configured to detect at least one vehicle type corresponding to the at least one hybrid vehicle 224. Further, the controller 506 may be communicatively coupled to the sensor 504 and the plurality of control gates. Further, the controller 506 may be configured for determining whether the at least one hybrid vehicle 224 may be capable of flying and autonomous driving based on detection of the at least one vehicle type. Further, the controller 506 may be configured for controlling the plurality of operational states of the plurality of control gates based on the determining.

Further, in an embodiment, the first exit portion may include a takeoff visual indication corresponding to the raised pathway 216. Further, the second entry portion may include a landing visual indication corresponding to the raised pathway 216.

Further, in an embodiment, the first exit portion may include a takeoff beacon configured to transmit a first unique data over short range radiofrequency signals. Further, the second entry portion may include a landing beacon configured to transmit second unique data over short range radiofrequency signals. Further, in an embodiment, the first unique data may include an autonomous mode activation command configured to activate autonomous driving mode of the at least one hybrid vehicle 224. Further, the second unique data may include an autonomous mode deactivation command configured to deactivate autonomous driving mode of the at least one hybrid vehicle 224.

Figure 6:
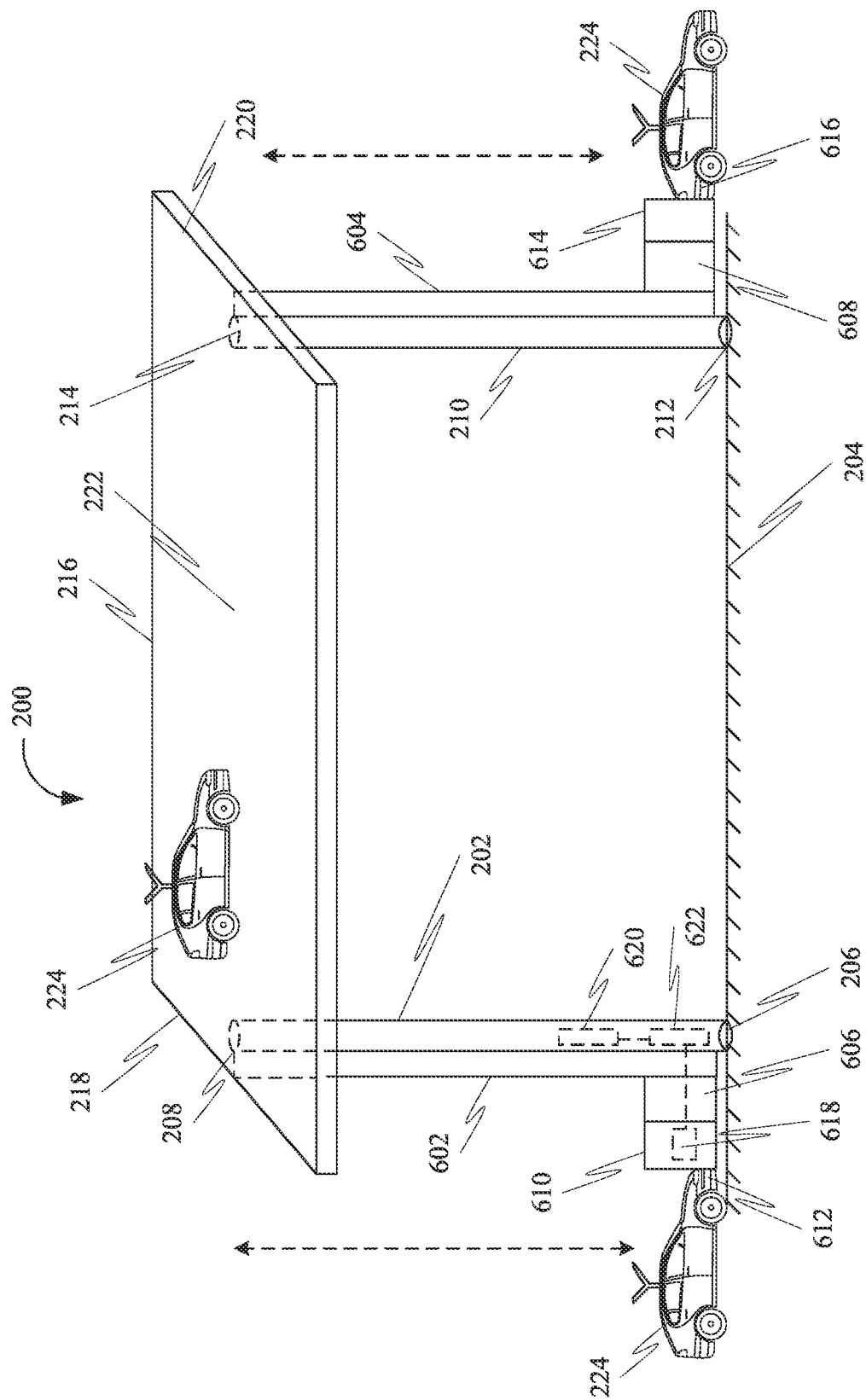
FIG. 6 is a schematic view of the transportation system with guide rails, in accordance with some embodiments.

Further, in some embodiments, the first pillar 202 may include a first guide rail 602 (as shown in FIG. 6) configured to guide movement of the at least one hybrid vehicle 224 along the first guide rail 602. Further, the second pillar 210 may include a second guide rail 604 (as shown in FIG. 6) configured to guide movement of the at least one hybrid vehicle 224 along the second guide rail 604. Further, each of the first guide rail 602 and the second guide rail 604 may include a first mating portion (610 and 614) of a coupling mechanism 606-608 configured to movably couple the at least one hybrid vehicle 224 with each of the first guide rail 602 and the second guide rail 604. Further, the coupling mechanism 606-608 may be configured to allow longitudinal movement of the at least one hybrid vehicle 224 along each of the first guide rail 602 and the second guide rail 604. Further, the coupling mechanism 606-608 may be configured to prevent lateral movement of the at least one hybrid vehicle 224 in relation to each of the first guide rail 602 and the second guide rail 604. Further, the at least one hybrid vehicle 224 may include a second mating portion (612 and 616) of the coupling mechanism 606-608.

Further, in an embodiment, the first mating portion (610 and 614) may include a speed limiting actuator 618 configured to exert a variable force against the second mating portion (612 and 616). Further, the variable force generates a controllable friction between the first mating portion (610 and 614) and the second mating portion (612 and 616). Further, the controllable friction limits a speed of movement of the at least one hybrid vehicle 224 along each of the first guide rail 602 and the second guide rail 604.

Further, in an embodiment, the transportation system 200 may include a communication device 620 (such as the communication device 408) and a controller 622 (such as the processing device 410). Further, the communication device 620 may be configured for receiving a speed limiting command from a transportation management device (such as the electronic devices 110, the mobile device 106, etc.) associated with the transportation system 200. Further, the transportation management device may be associated with at least one user (such as the user 112). Further, the transportation management device may include a computing device such as, but not limited to, a smartphone, a smartwatch, a tablet, a desktop, a laptop, and so on. Further, the controller 622 may be communicatively coupled to each of the communication device 620 and the speed limiting actuator 618. Further, the controller 622 may be configured for controlling the speed limiting actuator 618 based on the speed limiting command.

Further, in an embodiment, the transportation system 200 may include a speed sensor (such as the sensors 116) and a controller (such as the processing device 410). Further, the speed sensor may be configured to detect a speed of movement of the at least one hybrid vehicle 224 along at least one of the first guide rail 602 and the second guide rail 604. Further, the controller may be communicatively coupled to each of the speed sensor and the speed limiting actuator 618. Further, the controller may be configured for controlling the speed limiting actuator 618 based on detection of the speed.

Further, in an embodiment, the transportation system 200 may include a communication device (such as the communication device 408) and a controller (such as the processing device 410). Further, the communication device may be configured for receiving an arrest command from a transportation management device (such as the electronic devices 110, the mobile device 106, etc.) associated with the transportation system 200. Further, the transportation management device may be associated with at least one user (such as the user 112). Further, the transportation management device may include a computing device such as, but not limited to, a smartphone, a smartwatch, a tablet, a desktop, a laptop, and so on. Further, the controller may be communicatively coupled to each of the communication device and the actuator. Further, the controller may be configured for controlling the speed limiting actuator 618 based on the arrest command. Further, the variable force may be sufficient to arrest movement of the at least one hybrid vehicle 224 along each of the first guide rail 602 and the second guide rail 604 irrespective of a state of propulsion of the at least one hybrid vehicle 224.

Figure 7:
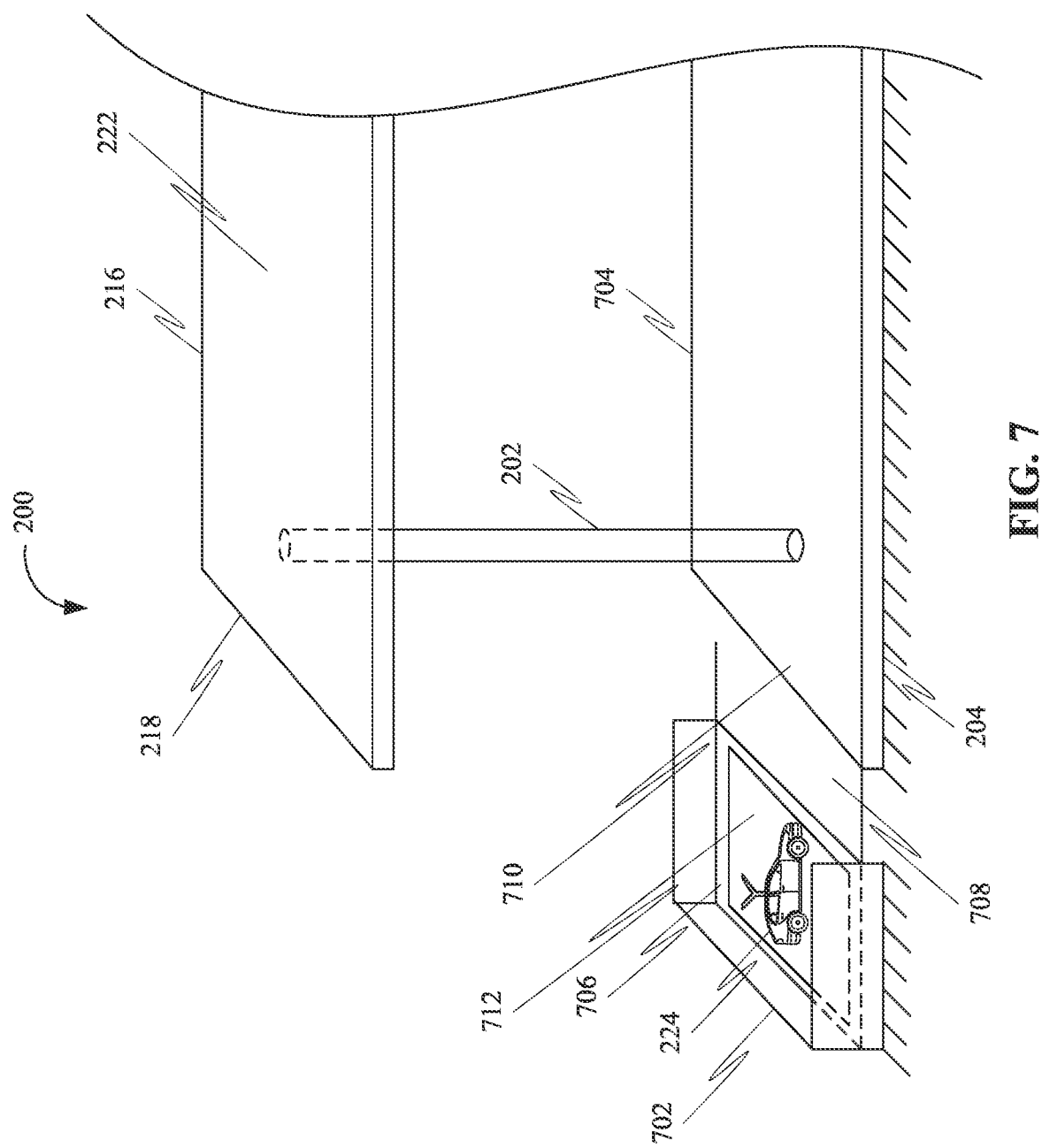
FIG. 7 is a partial schematic view of the transportation system with elevators, in accordance with some embodiments.

Further, in some embodiments, a plurality of elevators may be associated with the plurality of pillars. Further, an elevator 702 (as shown in FIG. 7) of the plurality of elevators may be configured for transporting the at least one hybrid vehicle 224 between the ground 204 and each of the first end 218 and the second end 220 of the raised pathway 216. Further, the elevator 702 may include a ground port 708 configured to facilitate movement of the at least one hybrid vehicle 224 between at least one of an exit portion 710 and an entry portion (not shown) of a ground pathway 704 and an interior space 706 of the elevator 702. Further, the elevator 702 may include a raised pathway port 712 configured to facilitate movement of the at least one hybrid vehicle 224 between the interior space 706 and at least one of the first end 218 and the second end 220 of the raised pathway 216.

Figure 9:
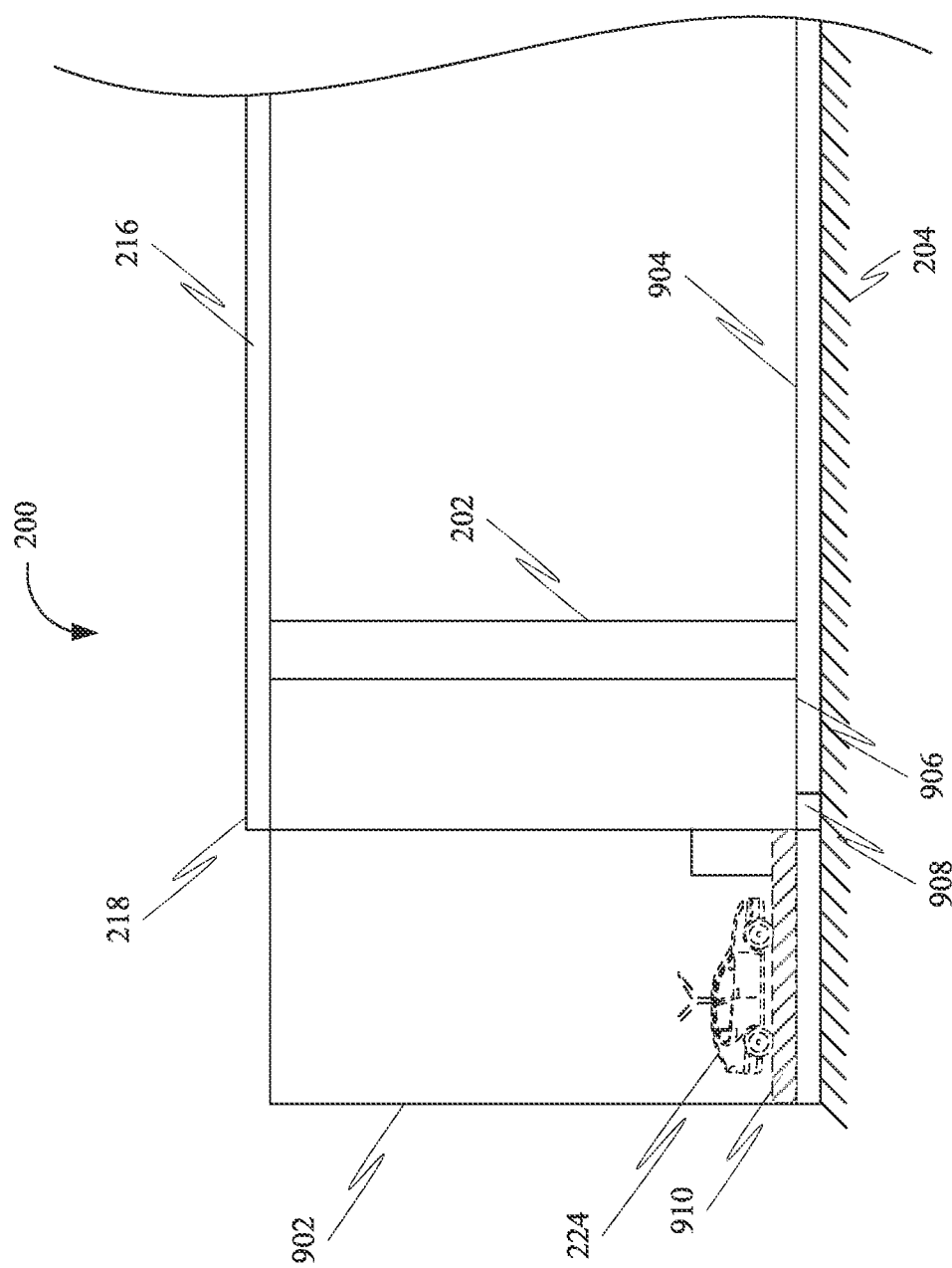
FIG. 9 is a partial schematic view of the transportation system with tubular enclosures, in accordance with some embodiments.

Further, in some embodiments, a plurality of tubular enclosures may be installed proximal to the plurality of pillars. Further, a tubular enclosure 902 (as shown in FIG. 9) may be configured to provide shelter to the at least one hybrid vehicle 224 during at least one of the ascent and the descent. Further, the tubular enclosure 902 may include a ground port 908 configured to facilitate movement of the at least one hybrid vehicle 224 between at least one of an exit portion 906 and an entry portion (not shown) of a ground pathway 904 and an interior space of the tubular enclosure 902. Further, the tubular enclosure 902 may include a raised pathway port 910 configured to facilitate movement of the at least one hybrid vehicle 224 between the interior space of the tubular enclosure 902 and at least one of the first end 218 and the second end 220 of the raised pathway 216.

Figure 11:
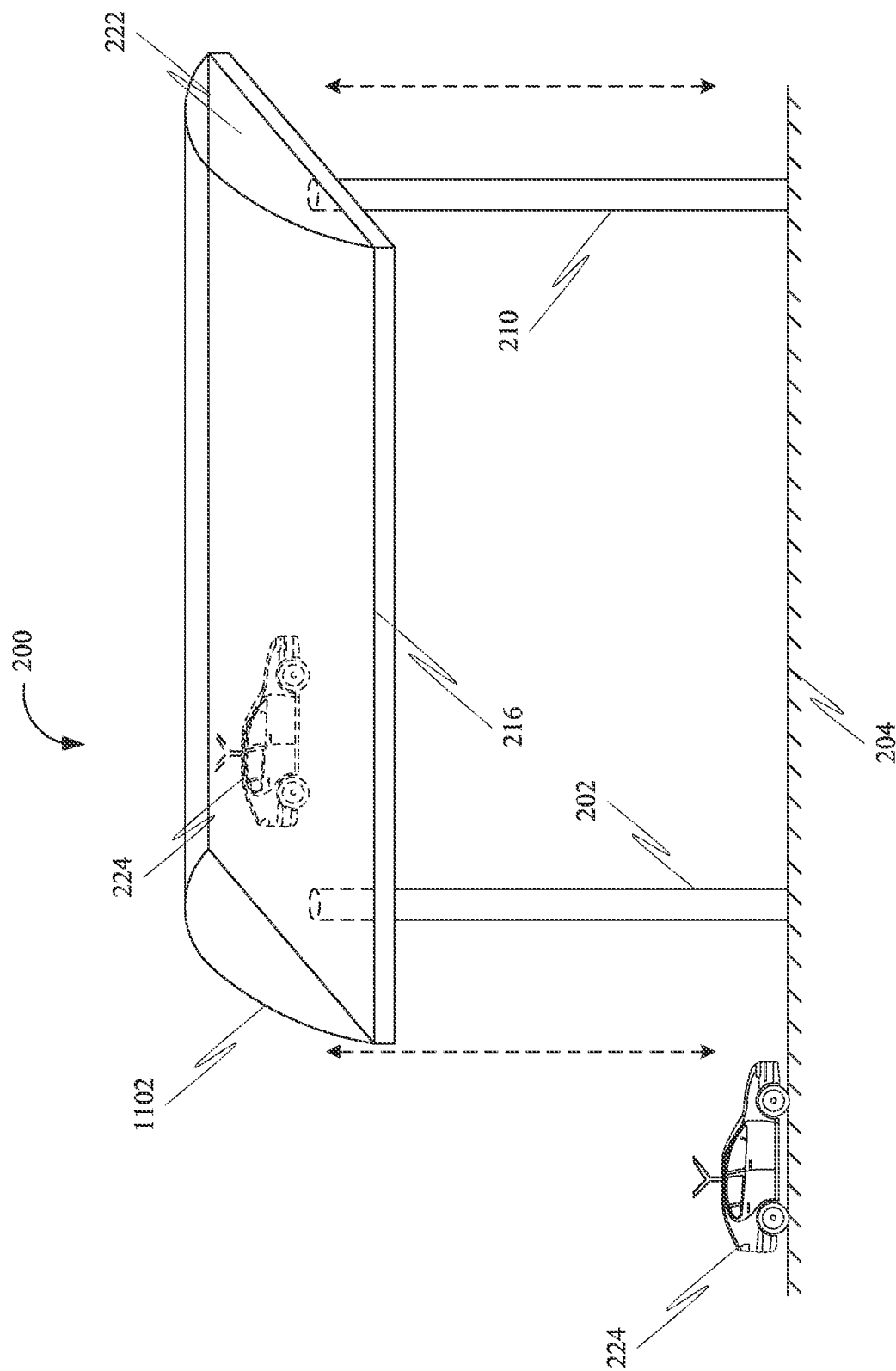
FIG. 11 is a schematic view of the transportation system with enclosures, in accordance with some embodiments.

Further, in some embodiments, the at least one raised pathway may include an enclosure 1102 (as shown in FIG. 11) configured to provide a shelter to the at least one raised transportation surface 222 and the at least one hybrid vehicle 224.

Figure 12:
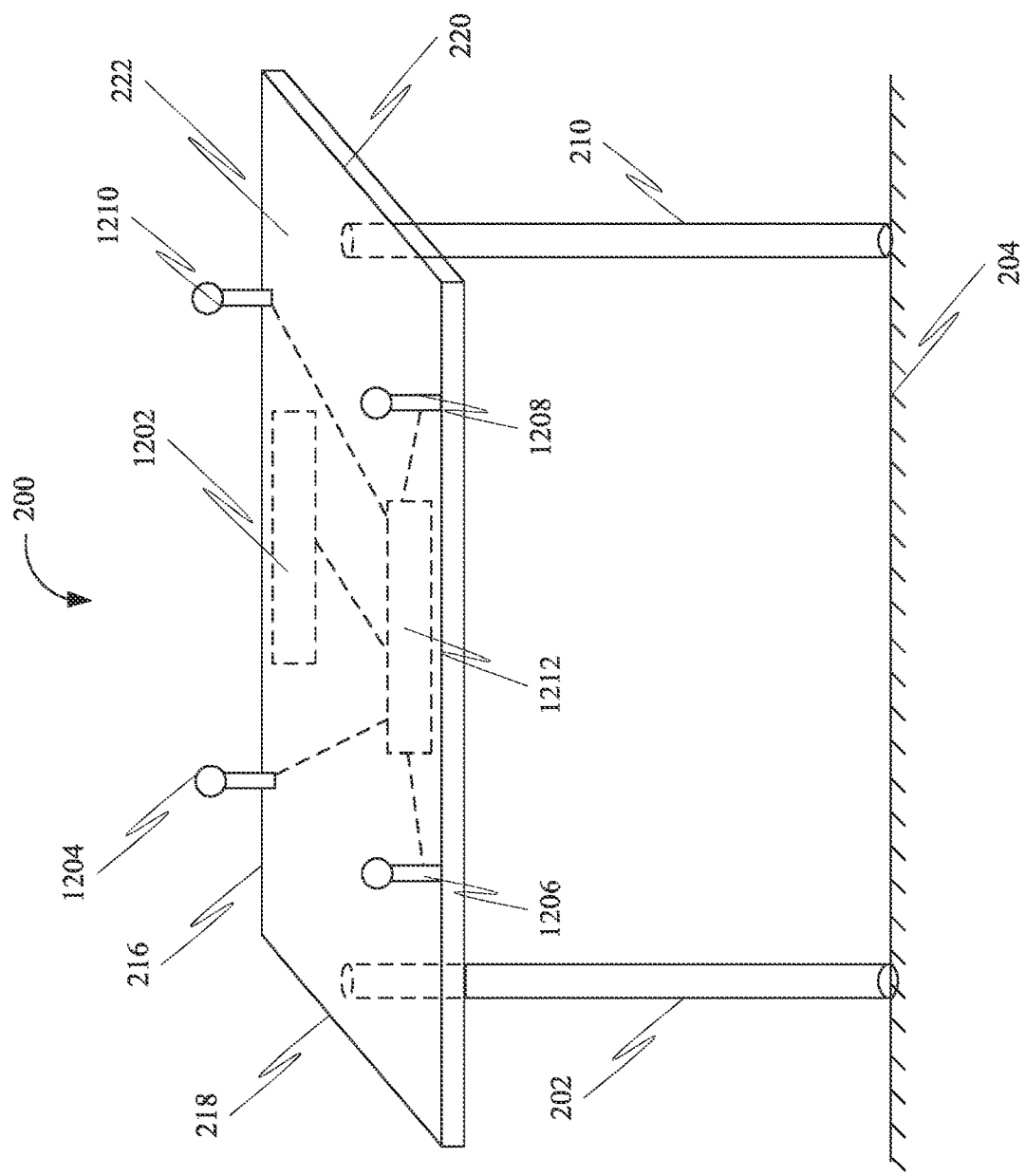
FIG. 12 is a schematic view of the transportation system with light sources, in accordance with some embodiments.

Further, in some embodiments, at least one solar panel 1202 (as shown in FIG. 12) may be mounted on the at least one raised pathway (such as the raised pathway 216). Further, the at least one solar panel 1202 may be configured to generate electricity from light radiation.

Further, in an embodiment, the transportation system 200 may include a plurality of light sources 1204-1210 and an energy storage system 1212, as shown in FIG. 12. Further, the plurality of light sources 1204-1210 may be installed at a plurality of locations on the at least one raised pathway. Further, the plurality of light sources 1204-1210 may be configured to illuminate the at least one raised transportation surface 222. Further, the energy storage system 1212 may be electrically coupled to each of the at least one solar panel 1202 and the plurality of light sources 1204-1210. Further, the energy storage system 1212 may be configured to store electricity generated by the at least one solar panel 1202 and provide electricity to the plurality of light sources 1204-1210.

Further, in some embodiments, the at least one raised pathway may include a plurality of raised pathways corresponding to a plurality of levels. Further, an upper level raised pathway 1302 may be separated from a lower level raised pathway 1304 by an inter-level gap. Further, a first end 1306 of the upper level raised pathway 1302 may be supported by a first upper level part 1308 of the first upper portion 208 of the first pillar 202. Further, a first end 1310 of the lower level raised pathway 1304 may be supported by a first lower level part 1312 of the first upper portion 208. Further, a second end 1314 of the upper level raised pathway 1302 may be supported by a second upper level part 1316 of the second upper portion 214 of the second pillar 210. Further, a second end 1318 of the lower level raised pathway 1304 may be supported by a second lower level part 1320 of the second upper portion 214 of the second pillar 210.

Further, in some embodiments, a height of the at least one raised pathway such as the raised pathway 216) may be at least 500 feet above the tallest structure in an urban area, and at least 360 feet above the tallest structure in rural areas.

Further, in some embodiments, the at least one raised transportation surface 222 may include at least one of asphalt and concrete.

FIG. 3 is a schematic view of the transportation system 200 with ground pathways, in accordance with some embodiments.

FIG. 4 is a schematic view of the transportation system 200 with the ground pathways, in accordance with some embodiments.

FIG. 5 is a schematic view of the transportation system 200 with control gates, in accordance with some embodiments.

FIG. 6 is a schematic view of the transportation system 200 with guide rails, in accordance with some embodiments.

FIG. 7 is a partial schematic view of the transportation system 200 with elevators, in accordance with some embodiments.

Figure 8:
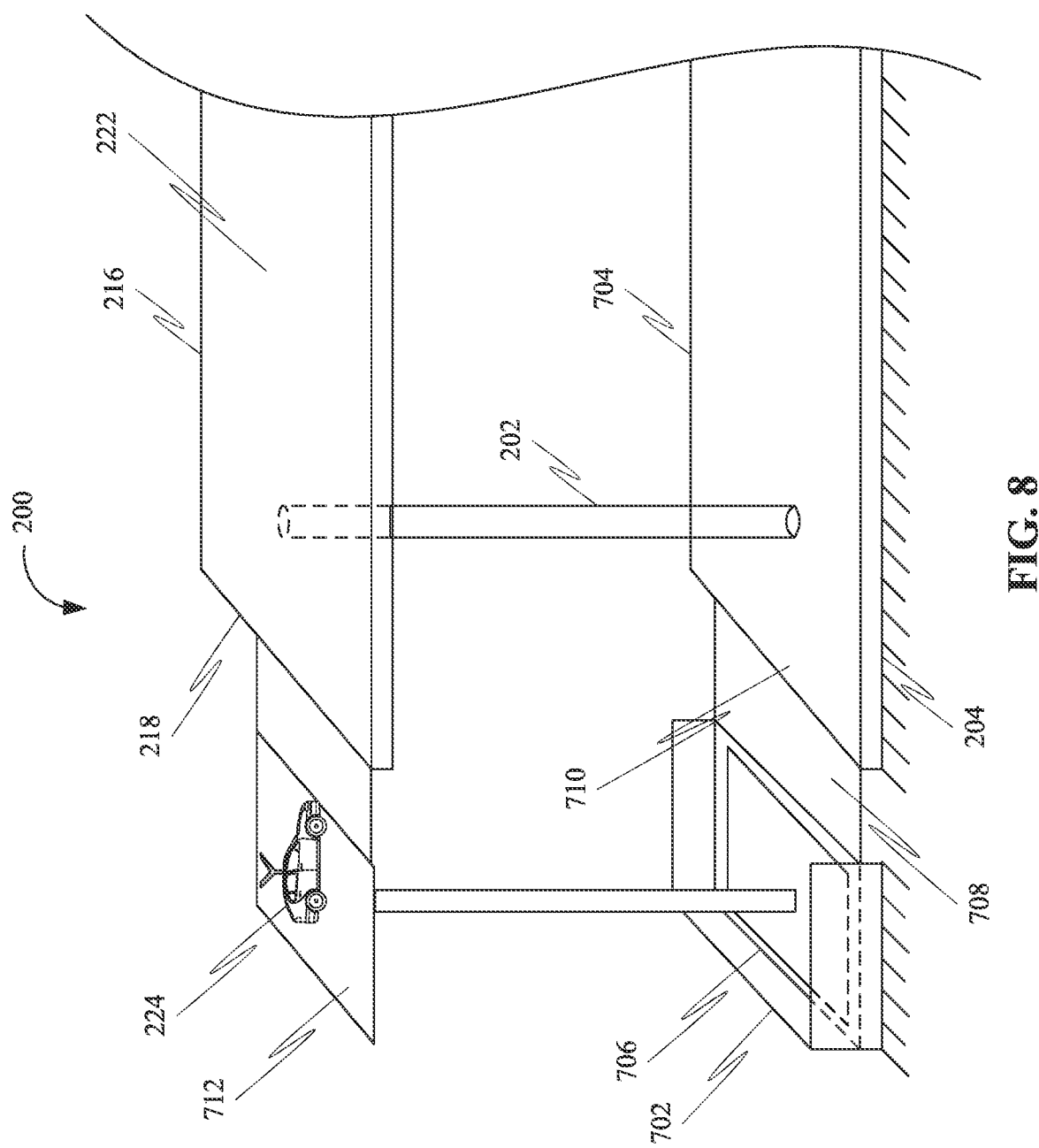
FIG. 8 is a partial schematic view of the transportation system with the elevators, in accordance with some embodiments.

FIG. 8 is a partial schematic view of the transportation system 200 with the elevators, in accordance with some embodiments.

FIG. 9 is a partial schematic view of the transportation system 200 with tubular enclosures, in accordance with some embodiments.

Figure 10:
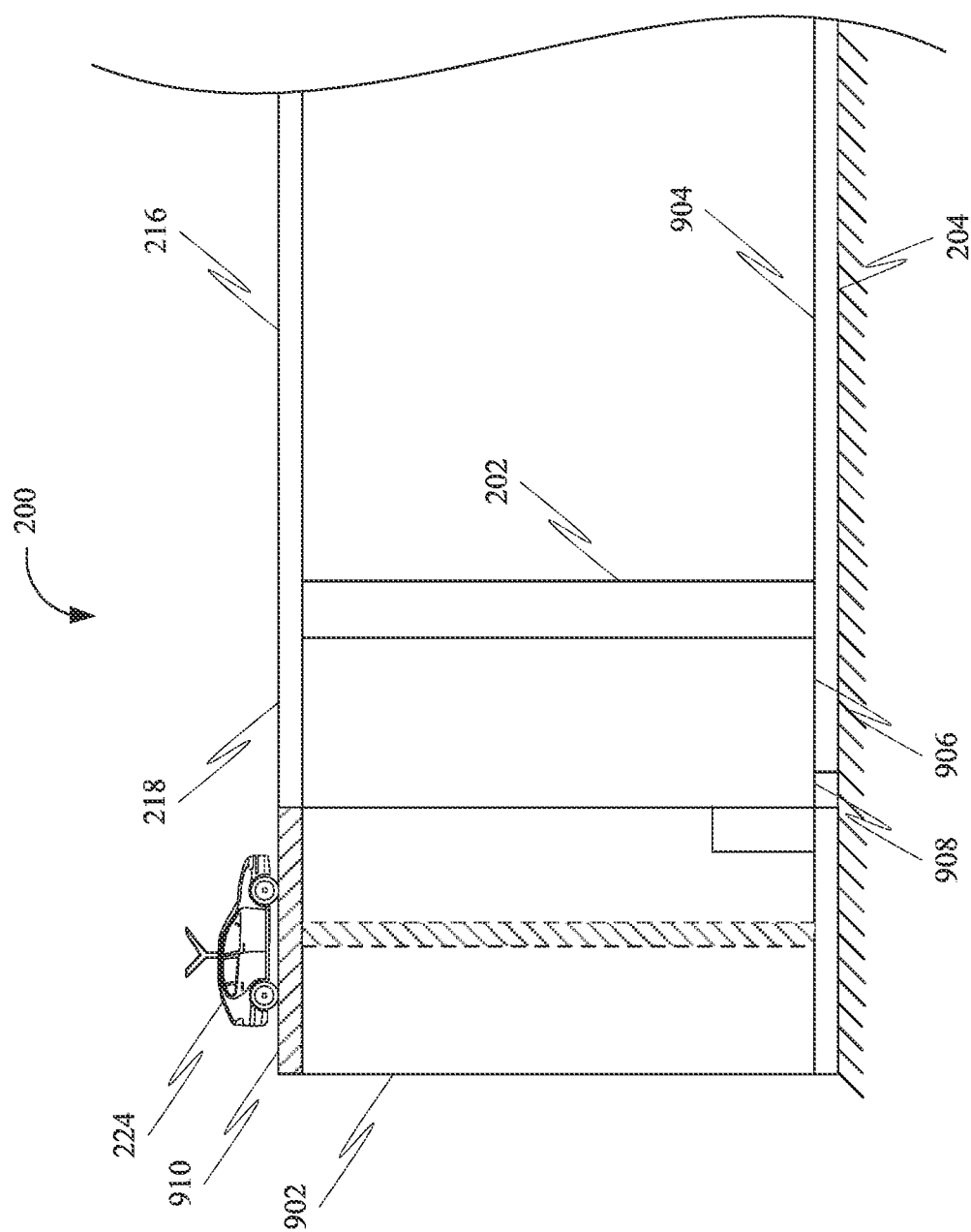
FIG. 10 is a partial schematic view of the transportation system with the tubular enclosures, in accordance with some embodiments.

FIG. 10 is a partial schematic view of the transportation system 200 with the tubular enclosures, in accordance with some embodiments.

FIG. 11 is a schematic view of the transportation system 200 with enclosures, in accordance with some embodiments.

FIG. 12 is a schematic view of the transportation system 200 with light sources, in accordance with some embodiments.

Figure 13:
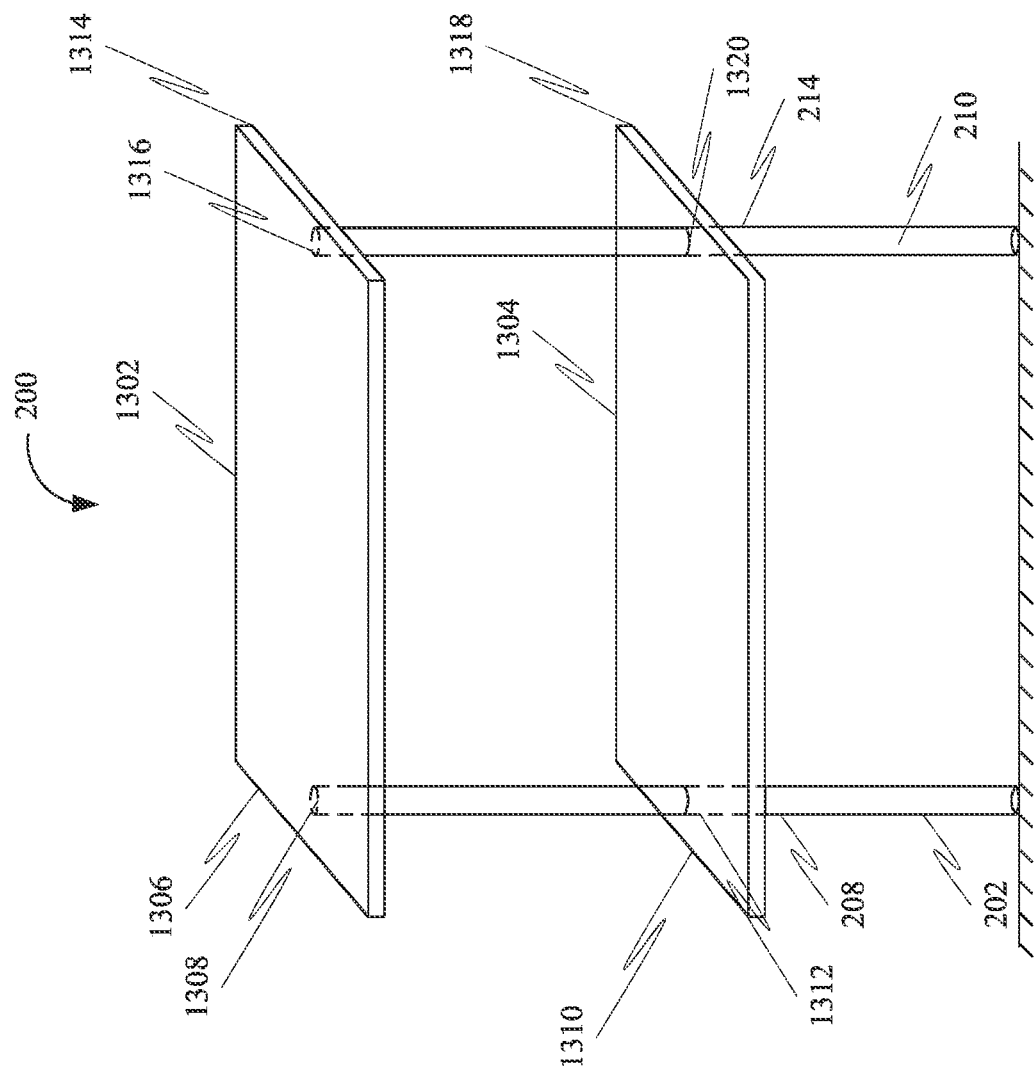
FIG. 13 is a schematic view of the transportation system with multiple raised pathways, in accordance with some embodiments.

FIG. 13 is a schematic view of the transportation system 200 with multiple raised pathways, in accordance with some embodiments.

Figure 14:
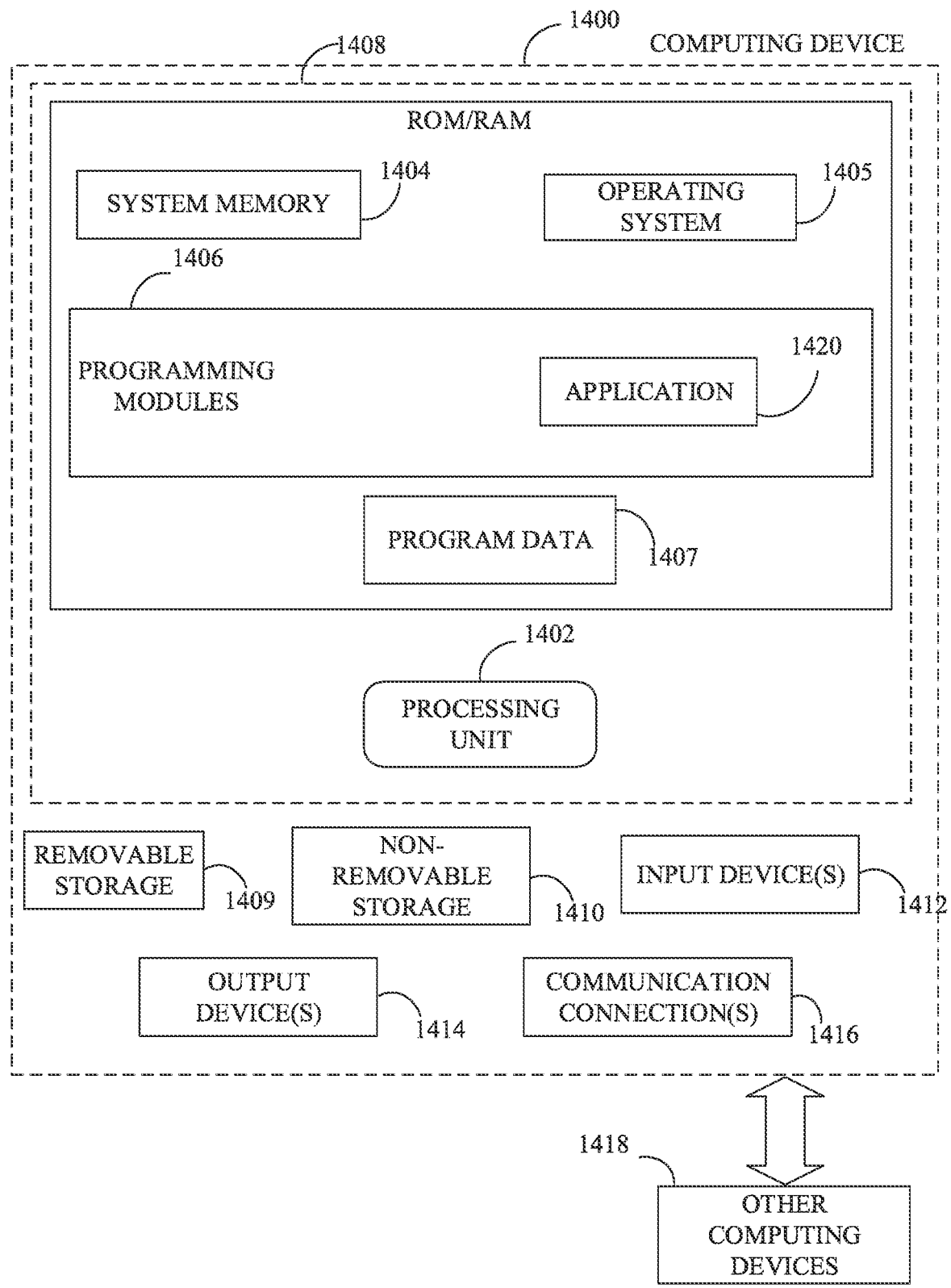
FIG. 14 is a block diagram of a computing device for implementing the methods disclosed herein, in accordance with some embodiments.

With reference to FIG. 14, a system consistent with an embodiment of the disclosure may include a computing device or cloud service, such as computing device 1400. In a basic configuration, computing device 1400 may include at least one processing unit 1402 and a system memory 1404. Depending on the configuration and type of computing device, system memory 1404 may comprise, but is not limited to, volatile (e.g. random-access memory (RAM)), non-volatile (e.g. read-only memory (ROM)), flash memory, or any combination. System memory 1404 may include operating system 1405, one or more programming modules 1406, and may include a program data 1407. Operating system 1405, for example, may be suitable for controlling computing device 1400's operation. In one embodiment, programming modules 1406 may include image-processing module, machine learning module. Furthermore, embodiments of the disclosure may be practiced in conjunction with a graphics library, other operating systems, or any other application program and is not limited to any particular application or system. This basic configuration is illustrated in FIG. 14 by those components within a dashed line 1408.

Computing device 1400 may have additional features or functionality. For example, computing device 1400 may also include additional data storage devices (removable and/or non-removable) such as, for example, magnetic disks, optical disks, or tape. Such additional storage is illustrated in FIG. 14 by a removable storage 1409 and a non-removable storage 1410. Computer storage media may include volatile and non-volatile, removable and non-removable media implemented in any method or technology for storage of information, such as computer-readable instructions, data structures, program modules, or other data. System memory 1404, removable storage 1409, and non-removable storage 1410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1400. Any such computer storage media may be part of device 1400. Computing device 1400 may also have input device(s) 1412 such as a keyboard, a mouse, a pen, a sound input device, a touch input device, a location sensor, a camera, a biometric sensor, etc. Output device(s) 1414 such as a display, speakers, a printer, etc. may also be included. The aforementioned devices are examples and others may be used.

Computing device 1400 may also contain a communication connection 1416 that may allow device 1400 to communicate with other computing devices 1418, such as over a network in a distributed computing environment, for example, an intranet or the Internet. Communication connection 1416 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1404, including operating system 1405. While executing on processing unit 1402, programming modules 1406 (e.g., application 1420 such as a media player) may perform processes including, for example, one or more stages of methods, algorithms, systems, applications, servers, databases as described above. The aforementioned process is an example, and processing unit 1402 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 15:
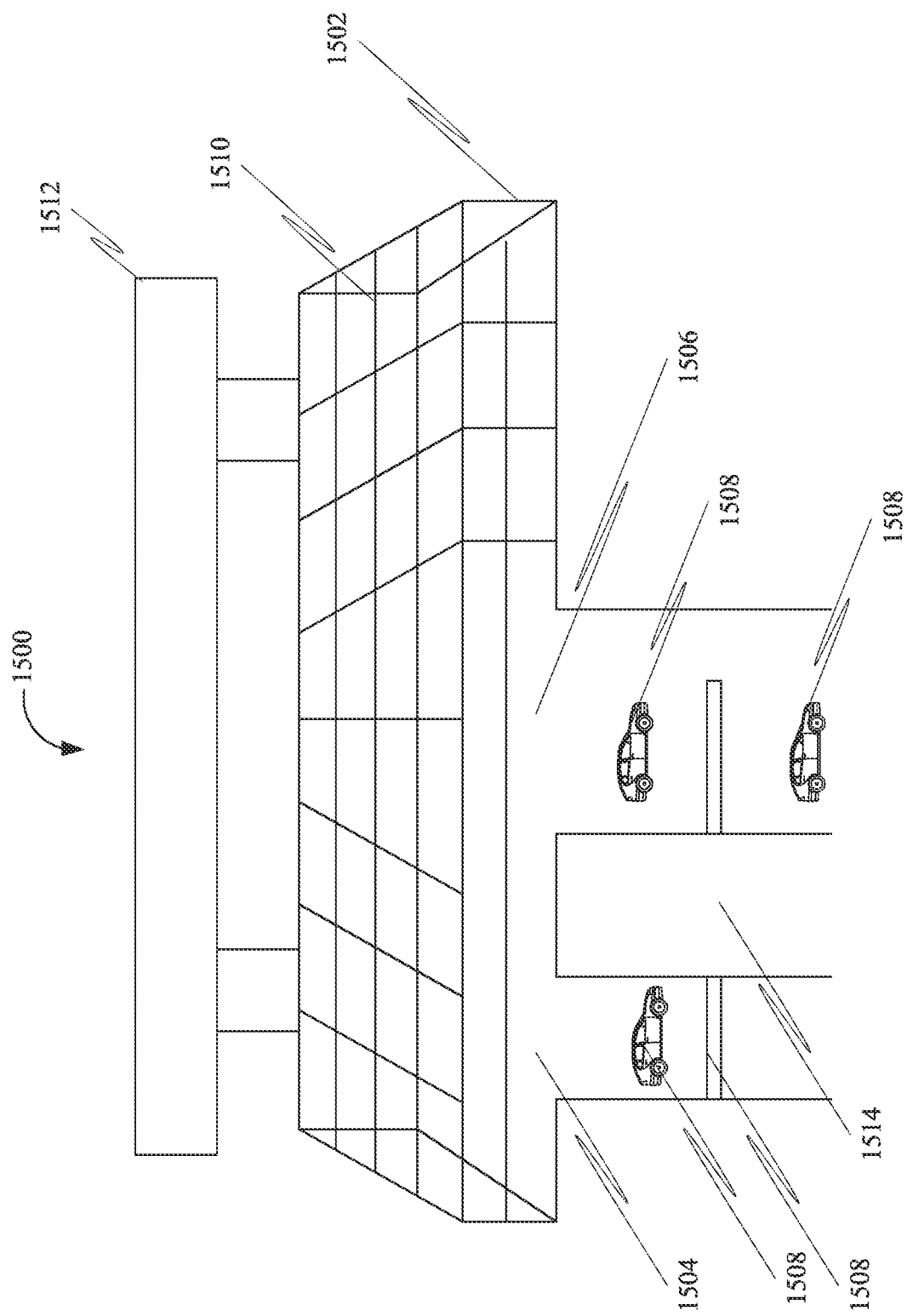
FIG. 15 is a schematic view of a transportation system for vehicles, in accordance with some embodiments.

FIG. 15 is a schematic view of a transportation system 1500 for vehicles, in accordance with some embodiments. Accordingly, the transportation system 1500 may include a raised pathway 1502 (such as the raised pathway 216). Further, the raised pathway 1502 may include at least one freeway. Further, the raised pathway 1502 may include at least one freeway exit 1504 and at least one freeway entrance 1506. Further, at least one vehicle 1508 (such as the at least one hybrid vehicle 224) may exit the raised pathway 1502 using the at least one freeway exit 1504. Further, the at least one vehicle 1508 may enter the raised pathway 1502 using the at least one freeway entrance 1506. Further, the at least one vehicle 1508 may include at least one flying car. Further, the raised pathway 1502 may include at least one cover 1510 for covering the raised pathway 1502. Further, the at least one cover 1510 may include at least one solar panel. Further, the raised pathway 1502 may include a second level 1512. Further, the second level 1512 may be expandable. Further, the second level 1512 may include at least one freeway. Further, the raised pathway 1502 may include at least one of a keystone block structure and a steel structure. Further, the raised pathway 1502 may include at least one safety stand 1514 associated with at least one of the at least one freeway entrance 1506 and the at least one freeway exit 1504. Further, the at least one safety stand 1514 may be hydraulic. Further, the at least one safety stand 1514 may be configured for safely transporting the at least one vehicle 1508 to the at least one freeway entrance 1506. Further, the at least one safety stand 1514 may be configured for safely transporting the at least one vehicle 1508 from the at least one freeway exit 1504.

Figure 16:
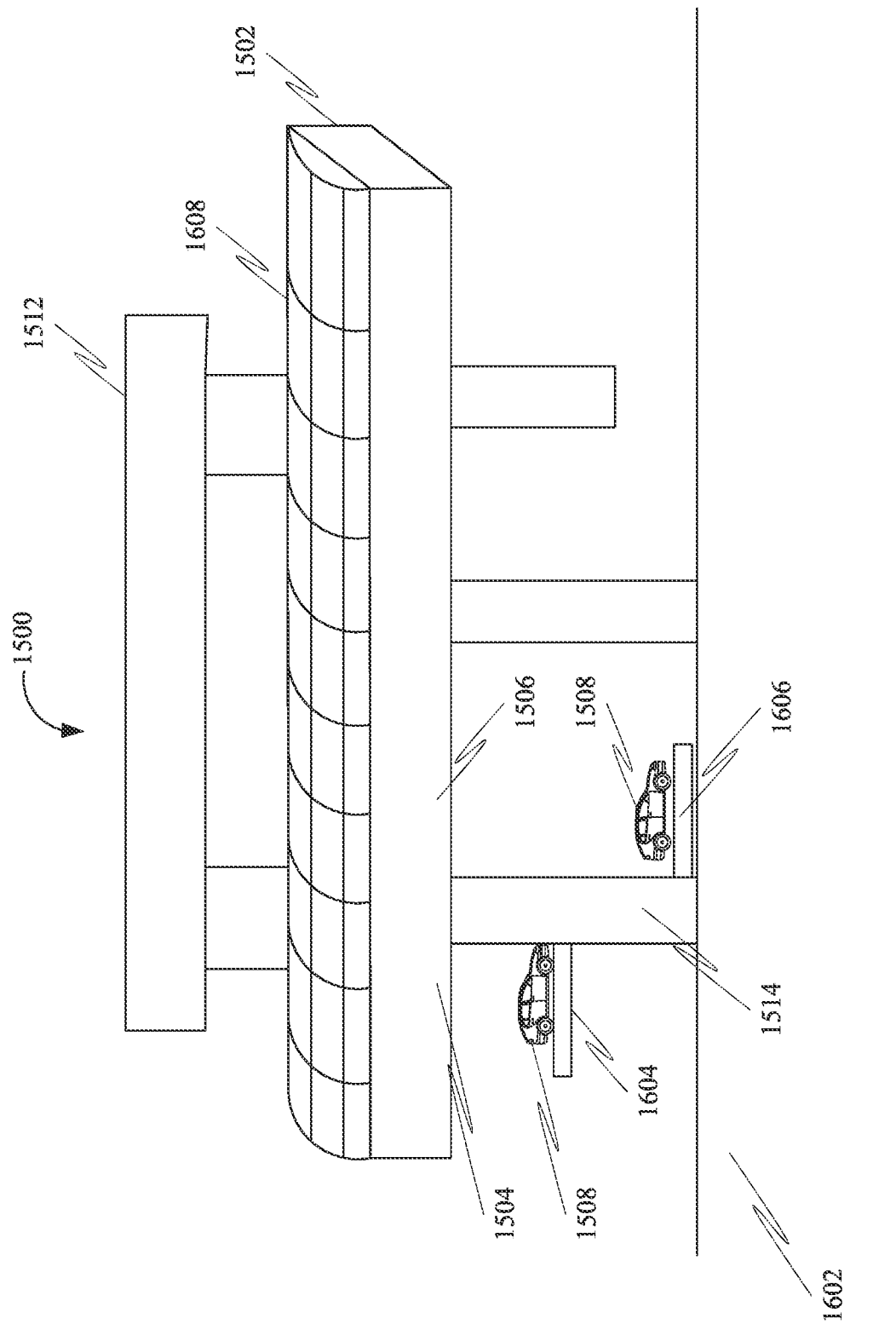
FIG. 16 is a schematic view of the transportation system with existing freeways, in accordance with some embodiments.

FIG. 16 is a schematic view of the transportation system 1500 with existing freeways, in accordance with some embodiments. Accordingly, the transportation system 1500 may include at least one existing freeway 1602. Further, the at least one existing freeway 1602 may be associated with the raised pathway 1502. Further, the raised pathway 1502 may include a self-driving environment. Further, the raised pathway 1502 may include at least one solar panel 1608. Further, the at least one vehicle 1508 may exit from the raised pathway 1502 to the at least one existing freeway 1602 using the at least one freeway exit 1504. Further, the at least one vehicle 1508 may enter the raised pathway 1502 from the at least one existing freeway 1602 using the at least one freeway entrance 1506. Further, the at least one safety stand 1514 may include at least one stand holder 1604-1606. Further, the at least one stand holder 1604-1606 may be configured for receiving the at least one vehicle 1508 for the transporting.

Figure 17:
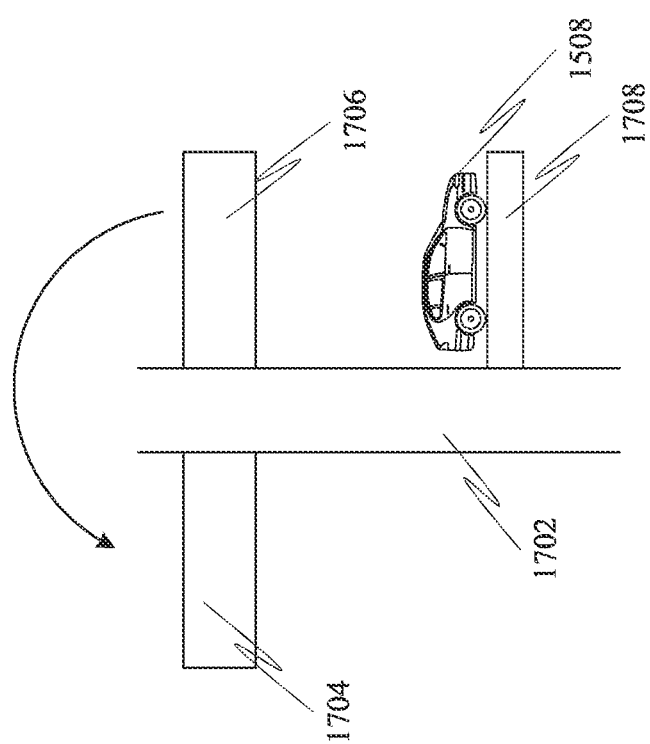
FIG. 17 is a schematic view of a safety stand of the transportation system, in accordance with some embodiments.

FIG. 17 is a schematic view of a safety stand 1702 of the transportation system 1500, in accordance with some embodiments. Accordingly, the safety stand 1702 may include at least one stand holder 1704-1708. Further, the at least one stand holder 1704-1708 may be configured for receiving the at least one vehicle 1508. Further, the at least one stand holder 1704-1708 may be laterally attached to the safety stand 1702 along the safety stand 1702. Further, the safety stand 1702 may be configured for rotating around a vertical axis of the safety stand 1702. Further, the rotating of the safety stand 1702 around the vertical axis may move the at least one stand holder 1704-1708 from a first side of the safety stand 1702 to a second side of the safety stand 1702.

Although the present disclosure has been explained in relation to its preferred embodiment, it is to be understood that many other possible modifications and variations can be made without departing from the spirit and scope of the disclosure.

The invention claimed is:

1. A transportation system for hybrid vehicles, the transportation system comprising:
   a plurality of pillars configured to be vertically mounted on the ground, wherein a first pillar of the plurality of pillars comprises a first lower portion and a first upper portion, wherein a second pillar of the plurality of pillars comprises a second lower portion and a second upper portion;
   at least one raised pathway supported by the plurality of pillars, wherein a raised pathway of the at least one raised pathway comprises a first end and a second end, wherein the first end is supported by the first upper portion of the first pillar, wherein the second end is supported by the second upper portion of the second pillar, wherein the at least one raised pathway comprises at least one raised transportation surface configured to facilitate transportation of at least one hybrid vehicle, wherein the at least one hybrid vehicle is configured for flying and moving over the at least one raised transportation surface, wherein the first pillar is further configured to guide an ascent of the at least one hybrid vehicle from the ground to the first end of the raised pathway, wherein the second pillar is further configured to guide a descent of the at least one hybrid vehicle from the second end of the raised pathway to the ground;
   a plurality of ground pathways, wherein each ground pathway comprises a ground transportation surface configured to facilitate transportation of the at least one hybrid vehicle, wherein each ground pathway comprises an exit portion and an entry portion, wherein a first exit portion of a first ground pathway is proximal to the first lower portion of the first pillar, wherein a second entry portion of the second ground pathway is proximal to the second lower portion of the second pillar;
   a plurality of sensors installed proximal to each of the exit portion and the entry portion, wherein the plurality of sensors is configured to capture at least one characteristic of the at least one hybrid vehicle;
   a storage device communicatively coupled to the plurality of sensors, wherein the storage device is configured for storing data corresponding to the at least one characteristic along with a time-stamp; and
   a communication device communicatively coupled to the storage device, wherein the communication device is configured for transmitting the data corresponding to the at least one characteristic to a transportation management device associated with the transportation system.

2. The transportation system of claim 1, wherein the first exit portion comprises a takeoff visual indication corresponding to the raised pathway, wherein the second entry portion comprises a landing visual indication corresponding to the raised pathway.

3. The transportation system of claim 1, wherein the first exit portion comprises a takeoff beacon configured to transmit a first unique data over short range radiofrequency signals, wherein the second entry portion comprises a landing beacon configured to transmit second unique data over short range radiofrequency signals.

4. The transportation system of claim 3, wherein the first unique data comprises an autonomous mode activation command configured to activate autonomous driving mode of the at least one hybrid vehicle, wherein the second unique data comprises an autonomous mode deactivation command configured to deactivate autonomous driving mode of the at least one hybrid vehicle.

5. The transportation system of claim 1, wherein the first pillar comprises a first guide rail configured to guide movement of the at least one hybrid vehicle along the first guide rail, wherein the second pillar comprises a second guide rail configured to guide movement of the at least one hybrid vehicle along the second guide rail, wherein each of the first guide rail and the second guide rail comprises a first mating portion of a coupling mechanism configured to movably couple the at least one hybrid vehicle with each of the first guide rail and the second guide rail, wherein the coupling mechanism is configured to allow longitudinal movement of the at least one hybrid vehicle along each of the first guide rail and the second guide rail, wherein the coupling mechanism is configured to prevent lateral movement of the at least one hybrid vehicle in relation to each of the first guide rail and the second guide rail, wherein the at least one hybrid vehicle comprises a second mating portion of the coupling mechanism.

6. The transportation system of claim 5, wherein the first mating portion comprises a speed limiting actuator configured to exert a variable force against the second mating portion, wherein the variable force generates a controllable friction between the first mating portion and the second mating portion, wherein the controllable friction limits a speed of movement of the at least one hybrid vehicle along each of the first guide rail and the second guide rail.

7. The transportation system of claim 6 further comprising:
   a communication device configured for receiving a speed limiting command from a transportation management device associated with the transportation system; and
   a controller communicatively coupled to each of the communication device and the speed limiting actuator, wherein the controller is configured for controlling the speed limiting actuator based on the speed limiting command.

8. The transportation system of claim 6 further comprising:
   a speed sensor configured to detect a speed of movement of the at least one hybrid vehicle along at least one of the first guide rail and the second guide rail; and
   a controller communicatively coupled to each of the speed sensor and the speed limiting actuator, wherein the controller is configured for controlling the speed limiting actuator based on detection of the speed.

9. The transportation system of claim 6 further comprising:
   a communication device configured fin receiving an arrest command from a transportation management device associated with the transportation system; and
   a controller communicatively coupled to each of the communication device and the actuator, wherein the controller is configured for controlling the speed limiting actuator based on the arrest command, wherein the variable force is sufficient to arrest movement of the at least one hybrid vehicle along each of the first guide rail and the second guide rail irrespective of a state of propulsion of the at least one hybrid vehicle.

10. The transportation system of claim 1 further comprising a plurality of elevators associated with the plurality of pillars, wherein an elevator of the plurality of elevator is configured for transporting the at least one hybrid vehicle between the ground and each of the first end and the second end of the raised pathway, wherein the elevator comprises a ground port configured to facilitate movement of the at least one hybrid vehicle between at least one of an exit portion and an entry portion of a ground pathway and an interior space of the elevator, wherein the elevator further comprises a raised pathway port configured to facilitate movement of the at least one hybrid vehicle between the interior space and at least one of the first end and the second end of the raised pathway.

11. The transportation system of claim 1 further comprising a plurality of tubular enclosures installed proximal to the plurality of pillars, wherein a tubular enclosure is configured to provide shelter to the at least one hybrid vehicle during at least one of the ascent and the descent, wherein the tubular enclosure comprises a ground port configured to facilitate movement of the at least one hybrid vehicle between at least one of an exit portion and an entry portion of a ground pathway and an interior space of the tubular enclosure, wherein the tubular enclosure further comprises a raised pathway port configured to facilitate movement of the at least one hybrid vehicle between the interior space of the tubular enclosure and at least one of the first end and the second end of the raised pathway.

12. The transportation system of claim 1, wherein the at least one raised pathway comprises an enclosure configured to provide a shelter to the at least one raised transportation surface and the at least one hybrid vehicle.

13. The transportation system of claim 1, further comprising at least one solar panel mounted on the at least one raised pathway, wherein the at least one solar panel is configured to generate electricity from light radiation.

14. The transportation system of claim 13 further comprising:
   a plurality of light sources installed at a plurality of locations on the at least one raised pathway, wherein the plurality of light sources is configured to illuminate the at least one raised transportation surface; and
   an energy storage system electrically coupled to each of the at least one solar panel and the plurality of light sources, wherein the energy storage system is configured to store electricity generated by the at least one solar panel and provide electricity to the plurality of light sources.

15. The transportation system of claim 1, wherein the at least one raised pathway comprises a plurality of raised pathways corresponding to a plurality of levels, wherein an upper level raised pathway is separated from a lower level raised pathway by an inter-level gap, wherein a first end of the upper level raked pathway is supported by a first upper level part of the first upper portion of the first pillar, wherein a first end of the lower level raised pathway is supported by a first lower level part of the first upper portion, wherein a second end of the upper level raised pathway is supported by a second upper level part of the second upper portion of the second pillar, wherein a second end of the lower level raised pathway is supported by a second lower level part of the second upper portion of the second pillar.

16. The transportation system of claim 1 further comprising:
   a plurality of control gates installed on the plurality of ground pathways, wherein a control gate is configured to prevent movement of the at least hybrid vehicle from a ground pathway to the exit portion of the ground pathway, wherein a control gate is configured to remain in one of a plurality of operational states comprising an open state and a closed state, wherein the control gate in the open state is configured to allow movement of the at least one hybrid vehicle from the ground pathway to the exit portion of the ground pathway, wherein the control gate in the closed state is configured to block movement of the at least one hybrid vehicle from the ground pathway to the exit portion of the ground pathway;
   a sensor configured to detect at least one vehicle type corresponding to the at least one hybrid vehicle;
   a controller communicatively coupled to each of the at least one sensor and the plurality of control gates, wherein the controller is configured for:
   determining whether the at least one hybrid vehicle is capable of flying and autonomous driving based on detection of the at least one vehicle type; and
   controlling the plurality of operational states of the plurality of control gates based on the determining.

17. The transportation system of claim 1, wherein a height of the at least one raised pathway is at least 500 feet above the tallest structure in an urban area, and at least 360 feet above the tallest structure, in rural areas.

18. The transportation system of claim 1, wherein the at least one raised transportation surface comprises at least one of asphalt and concrete.

* * * * *